(12) United States Patent
Barron et al.

(10) Patent No.: US 7,026,414 B1
(45) Date of Patent: Apr. 11, 2006

(54) METHODS FOR THE PREPARATION OF MONODISPERSE HIGH POLYMERS BY MECHANICAL DEGRADATION

(75) Inventors: Annelise E. Barron, Evanston, IL (US); Jacob M. Zahn, Evansville, IN (US); Brett A. Buchholz, Chicago, IL (US)

(73) Assignee: Northwestern University, Evanston, IL (US)

( * ) Notice: Subject to any disclaimer, the term of this patent is extended or adjusted under 35 U.S.C. 154(b) by 488 days.

(21) Appl. No.: 10/313,936

(22) Filed: Dec. 6, 2002

Related U.S. Application Data

(60) Provisional application No. 60/337,187, filed on Dec. 6, 2001.

(51) Int. Cl.
*C08F 283/00* (2006.01)
(52) U.S. Cl. .................................. 525/502 R; 525/418
(58) Field of Classification Search ................ 525/418, 525/502 R
See application file for complete search history.

(56) References Cited

U.S. PATENT DOCUMENTS

| | | | |
|---|---|---|---|
| 5,264,536 A | 11/1993 | Radosz | |
| 2004/0030058 A1* | 2/2004 | Destarac et al. | 525/418 |

FOREIGN PATENT DOCUMENTS

| | | | |
|---|---|---|---|
| WO | WO 99/33899 | * | 7/1999 |

OTHER PUBLICATIONS

Nguyen, T.Q. and Kausch, H.H. Mechano-chemical degradation of polymer solution in capillary flow. Laminar and turbulent regime. Northwestern University, Chemical Engineering Dept. March 13, 1986.

Merrill, E.W. and Leolairat. P. Scission of non-Interpenetrating macromolecules in transient extensional flows. Polymer Engineering and Science, Mid-May, 1980, vol. 20, No. 7.

* cited by examiner

*Primary Examiner*—Terressa Boykin
(74) *Attorney, Agent, or Firm*—Reinhart Boerner VanDeuren s.c.

(57) ABSTRACT

Monodisperse high polymer compositions and related methods for reduction of polydispersity indices.

28 Claims, 5 Drawing Sheets

METHODS FOR THE PREPARATION OF MONODISPERSE HIGH POLYMERS BY MECHANICAL DEGRADATION

This application claims priority benefit from provisional application Ser. No. 60/337,187 filed Dec. 6, 2001, the entirety of which is incorporated herein by reference.

BACKGROUND OF THE INVENTION

Monodisperse high polymers are increasingly desirable in industries requiring stringent material characterization and quality control. Polydispersity indices (defined as the weight-averaged molar mass of a polymer sample divided by the number-averaged molar mass of the same polymer sample) of less than 1.20 are not currently achievable by controlled polymerization methods such as anionic living polymerization in polymers of molar masses that exceed about 500,000 g/mol (generally defined as "high polymers"). The definition of "narrow" molar mass distribution, "low polydispersity" or "monodisperse" for a polymer may vary with the application; however, current methods generally enable the preparation of polymer samples with polydispersity indices of approximately 1.10–1.30. Achieving polydispersities lower than 1.15 for high polymers is generally extremely difficult. A measurable polydispersity index lower than about 1.09 for a polymer with a molar mass of greater than 500,000 g/mol (i.e., for a high polymer) is difficult to achieve, particularly so with water soluble polymers.

Methodologies of the prior art to produce monodisperse polymer samples are generally based on living polymerization, a process by which prematurely terminated polymer molecules for high molar mass polymers are catalytically "revived" by inorganic ligands and carried out to a chain length near a desired value through the amount of monomer supplied. [Inoue S: Immortal Polymerization: The Outset, Development, and Application. Journal of Polymer Science-A 2000: 38: 2861–2871.] Anionic polymerization is a type of living polymerization involving the use of anionic inorganic materials as catalysts for controlled polymerization [Lee J, Hogen-Esch T E: Synthesis and Characterization of Narrow Molecular Weight Distribution AB and ABA Poly(vinylpyridine)-Poly(dimethylsiloxane) Block Copolymers via Anionic Polymerization. Macromolecules 2001: 34: 2805–2811; Hong K, Mays J W: 1,3-Cyclohexadiene Polymers. 1. Anionic Polymerization. Macromolecules 2001: 34: 782–786]. Living polymerization necessitates minimization of any side reactions, i.e., all reactions except chain growth from a living end. There is, accordingly, a strict limitation in the polymers made by this method to those without unduly reactive side chains or substituents. As a result, many classes of water-soluble polymer with reactive side chains cannot be made by living polymerization [Zhou X Z, Shea K J: Synthesis of Poly(methylene-b-styrene) by Sequential Living Polymerization. Macromolecules 2001: 34: 3111–3114; Gottfried A C, Brookhart M: Living Polymerization of Ethylene Using Pd(II) α-Dimine Catalysts. Macromolecules: 34: 1140–1142; Trzaska S T, Lee L W, Register R A: Synthesis of Narrow-Distribution "Perfect" Polyethylene and Its Block Copolymers by Polymerization of Cyclopentene. Macromolecules 2000: 33: 9215–9221; Xu G, Chung T C: Synthesis of Syndiotactic Polystyrene Derivatives Containing Amino Groups. Macromolecules 2000: 33: 5803–5809].

Difficulties are also encountered for polymers of lesser molar mass. Many chemical methods necessary to ensure monodispersity are both relatively expensive and hazardous when compared to more conventional methods of polymerization: such as common free-radical polymerization, for example, because of the metallic catalysts used [Nonaka H, Ouchi M, Kamigaito M, Sawamoto M: MALDI-TOF-MS Analysis of Ruthenium(II)-Mediated Living Radical Polymerizations of Methyl Methacrylate, Methyl Acrylate, and Styrene. Macromolecules 2000: 34: 2083–2088; Gottfried A C, Brookhart M: Living Polymerization of Ethylene Using Pd(II) α-Dimine Catalysts. Macromolecules: 34: 1140–1142; Kotani Y, Kamigaito M, Sawamoto M: Living Radical Polymerization of Para-Substituted Styrenes and Synthesis of Styrene-Based Copolymers with Rhenium and Iron Complex Catalysts. Macromolecules 2000: 33: 6746–6751; Kotani Y, Kamigaito M, Sawamoto M: Living Radical Polymerization of Styrene by Half-Metallocene Iron Carbonyl Complexes. Macromolecules 2000: 33: 3543–3549; Kubo H, Hayano S, Masuda T: Polymerization of Aliphatic Disubstituted Acetylenes by $MoOCl_4$-n-$Bu_4Sn$-EtOH Catalyst: Formation of Polymers with N arrow MWDs and Confirmation of the Living Character. Journal of Polymer Science-Part A: Polymer Chemistry 2000: 38: 2697–2701].

As evident from the preceding, the preparation of monodisperse high polymers has been an ongoing concern in the art. Macromolecular materials of molar masses in the range of about $10^5$–about $10^7$ g/mol and of a relatively narrow molar mass distribution (<1.10) would be highly desirable for a number of applications in the biomedical and pharmaceutical industries. Also, a simple, low-cost route to polymers with a narrow molar mass distribution would facilitate the manufacture and processing of materials through enhanced quality control and more narrowly defined and foreknown material properties. New applications for monodisperse polymers would likely be developed if such materials were more readily attainable.

Pass (1) $M_w$ 2.3×10$^6$ g/mol, PDI: 1.33. 2 Passes (2) $M_w$ 1.6×10$^6$ g/mol, PDI: 1.21. 4 Passes (4) $M_w$ 1.3×10$^6$ g/mol, PDI: 1.12. 5 Passes (5) $M_w$ 1.2×10$^6$ g/mol, PDI: 1.08.

Figure 7:
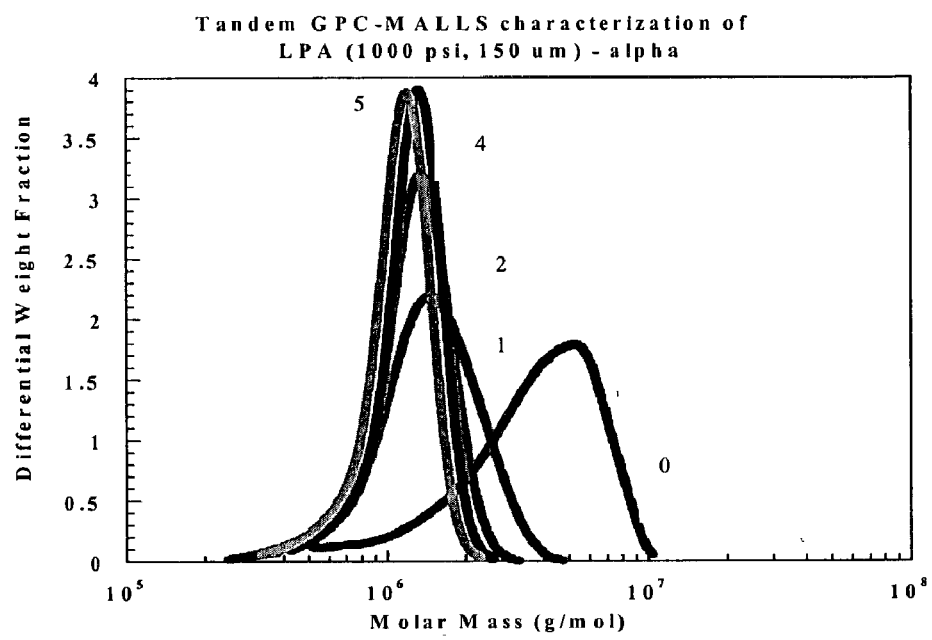

FIG. 7: Mechanical degradation of linear polyacrylamide (LPA) at an input pressure of 1,000 psi, with a capillary inner diameter of 150 micrometers and a concentration of 0.1% w/v. Original Sample (0), $M_w$ 4.1×10$^6$ g/mol, PDI: 1.42. 1 Pass (1) $M_w$ 1.5×10$^6$ g/mol, PDI: 1.24. 2 Passes (2) $M_w$ 1.3×10$^6$ g/mol, PDI: 1.13. 4 Passes (4) $M_w$ 1.3×10$^6$ g/mol, PDI: 1.08. 5 Passes (5) $M_w$ 1.1×10$^6$ g/mol, PDI: 1.09.

Figure 8:
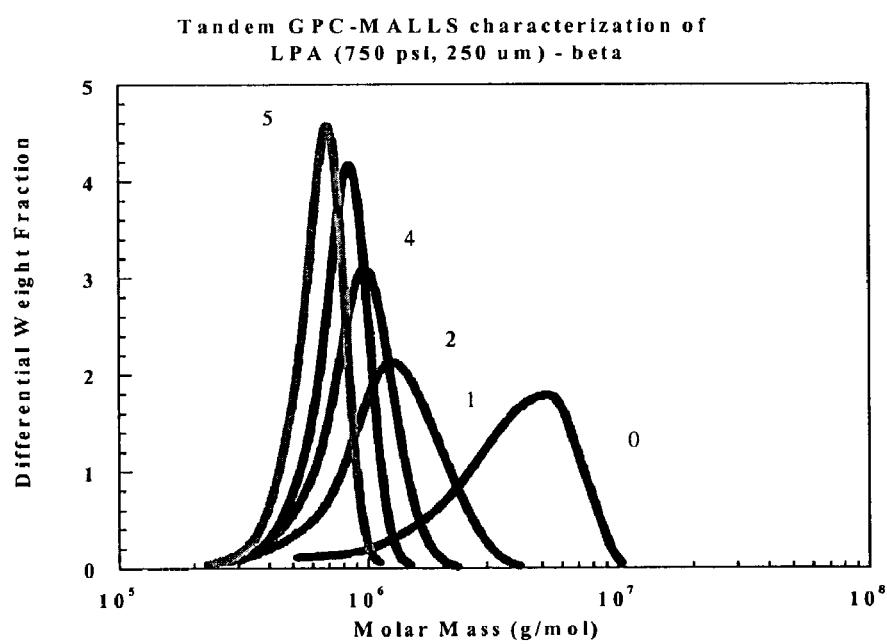

FIG. 8: Mechanical degradation of linear polyacrylamide (LPA) at an input pressure of 750 psi, with a capillary inner diameter of 250 micrometers and a concentration of 0.1% w/v. Original Sample (0), $M_w$ 4.1×10$^6$ g/mol, PDI: 1.42. 1 Pass (1) $M_w$ 1.3×10$^6$ g/mol, PDI: 1.26. 2 Passes (2) $M_w$ 9.4×10$^5$ g/mol, PDI: 1.13. 4 Passes (4) $M_w$ 7.9×10$^5$ g/mol, PDI: 1.07. 5 Passes (5) $M_w$ 6.4×10$^5$ g/mol, PDI: 1.06.

SUMMARY OF THE INVENTION

In light of the foregoing, it is an object of the present invention to provide a broadly applicable method for the preparation of high polymers, such a method overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all instances, to every aspect of this invention. As such, the following objects can be used in the alternative with respect to any one aspect of this invention.

It can be an object of the present invention to use physical or mechanical forces for the controlled degradation and/or scission of a polymer chain to provide monodisperse polymers and/or those having low polydispersities, such polymers having molar masses in the range of about 10$^5$–about 10$^7$ g/mol.

It can also be an object of the present invention to achieve a low polydispersity index for a polymer initially prepared in accordance with the prior art, the reduction in polydispersity achieved post-polymerization and through modification of the polymer in solution or a suitable fluid medium.

It can also be an object of the present invention to provide a physical method whereby the molar mass distribution of a polymer solution can be modified post-polymerization, to provide a polymer having a polydispersity lower than about 1.09. Accordingly, a related objective of this invention is to provide various polymeric compositions of matter, irrespective of their chemical nature, having polydispersity indices lower than those heretofore available through methods of the prior art.

It can also be an object of the present invention to provide a general method for polymer preparation and/or processing so as to tailor polymer production to a particular, designed average molar mass.

It can also be an object of the present invention to provide a broadly applicable method for polymer preparation and/or processing which can be employed without limitation by polymer composition or solution thereof, effective in aqueous, organic or mixed solvent or fluid media systems.

Other objects, features, benefits and advantages of the present invention will be apparent from this summary and its descriptions, and will be readily apparent to those skilled in the art made aware of this invention and having knowledge of various polymerization processes and the polymeric materials derived therefrom. Such objects, features, benefits and advantages will be apparent from the above as taken in conjunction with the accompanying examples, tables, data and all reasonable inferences to be drawn therefrom.

The present invention demonstrates the efficacy of mechanical degradation as a tool for polymer processing for a large range of commonly used industrial polymers including, but not limited to various polyesters, polyamides, polyolefins, polyfluorocarbons, polyurethanes, and polyimides, as well as those materials under the broad category of biopolymers. Such polymers are subject to mechanical degradation and can be broken down to a specifically determined molar mass as well as to a controlled polydispersity index via passage through an extensional flow field and exposure to purely physical forces. Chemical processes are necessarily species-specific and do not have the wide applicability of a physical/mechanical process. Moreover, the mechanical methods of this invention may be carried out at ambient temperatures in air—unlike many chemical polymerization processes which may require a highly controlled environment, i.e., at high temperatures and/or pressures or under inert atmospheres.

The use of extensional flow effects and mechanical degradation for processing of high polymers provides a reliable, economical, and efficient method to produce monodisperse polymers in a fashion at least as controllable as chemical processes. The methods of this invention can be easily scaled up for an arbitrarily large throughput without a large increase in cost. In this manner, a polymer product of a desired molar mass and polydispersity can be reliably and generally produced in an industrial setting, without the proliferation of harmful side-reactions or the use of expensive and toxic reagents.

Figure 1:
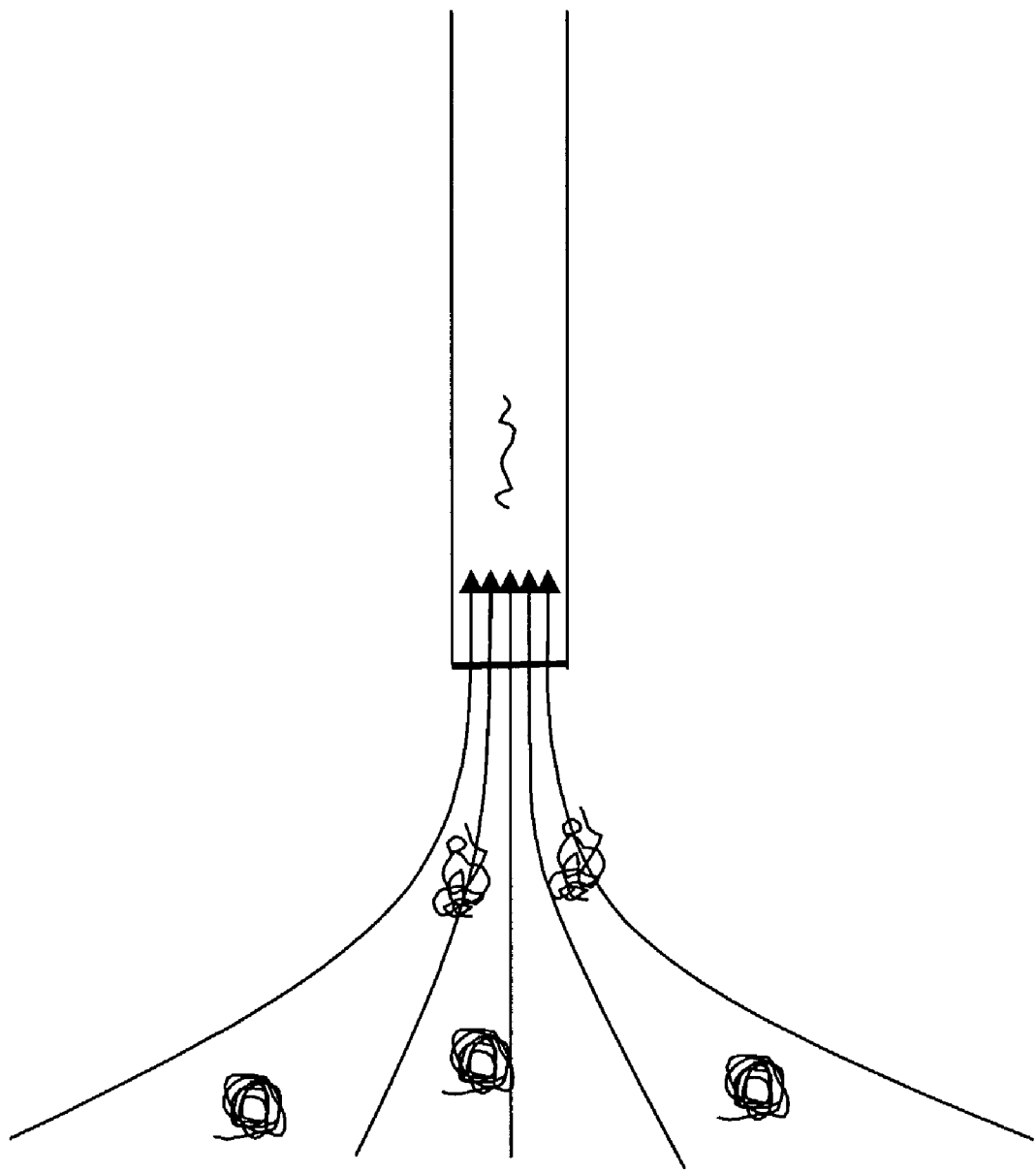
FIG. 1: Schematic illustration of elongational flow and polymer coil deformation.

Various aspects of and/or relating to the methods and compositions of this invention can be considered in light of fluid flow and solution dynamics. In particular, fluids encounter a spatial constriction in the process of being injected through a capillary, or cylindrical tube under an applied pressure. With reference to FIG. 1, spatial constriction exerts what is known as extensional stress at the region of flow wherein velocity streamlines converge [Odell J A, Muller A J, Narh K A, Keller A: Degradation of Polymer Solutions in Extensional Flows. Macromolecules 1990: 23: 3092–3103]. When a fluid contains dissolved polymers, these long-chain molecules can be stretched with a high rate of chain extension upon traversing this region of the flow field. Polymer molecules in solution will move in the direction of flow in a loosely coiled equilibrium conformation, towards the constriction. As the molecule encounters the extensional stresses in the flow field caused by the converging of velocity streamlines, the chain undergoes a conformational transition from a random coil to an elongated, extended (in the direction of flow) chain [DeGennes P G: Coil-Stretch Transition of Dilute Flexible Polymers Under Ultrahigh Velocity Gradients. Journal of Chemical Physics 1974: 60: 5030–5042; Larson R G, Magda J J: Coil-Stretch Transitions in Mixed Shear and Extensional Flows of Dilute Polymer Solutions. Macromolecules 1989: 22: 3004–3010]. This uncoiling phenomenon may be understood by the definition of the extensional strain rate, given below $$\frac{dv_x}{dx} = \varepsilon \qquad \text{(eq. 1)}$$

where $v_x$ is the velocity in the direction of flow, x is the largest chain dimension in the direction of flow, and $\epsilon$ is the extensional strain rate [Frenkel J: Orientation and Rupture of Linear Macromolecules in Dilute Solutions under the Influence of Viscous Flow. Acta Physicochimica U.R.S.S. 1944: 19(1): 51–76]. The rate of change of velocity in the direction of flow, caused by the constriction in flow, determines the rate at which the polymer molecule is extended.

In the case of polymer molecules traversing an extensional or elongation flow field, it is believed, depending on the nature of the field flow, stresses are maximized near the center or midpoint of the extended polymer chain [Horn A F, Merrill E W: Midpoint Scission of macromolecules in dilute solution in turbulent flow. Nature 1984: 312: 140–141]. Should the extensional strain rate exceed the value for the critical strain rate of a C—C or other molecular bond at the midpoint, the molecule will undergo scission and be reduced to two smaller chain molecules of approximately equal molar mass. Occurrences of scission in bonds not near the midpoint of the extended molecule are conjectured to be statistically insignificant. Critical strain rate is dependent upon polymer molar mass, and it has been shown that larger molecules have smaller critical strain rates [Muller A J, Odell J A, Keller A: Polymer Degradation in Extensional Flows. Polymer Communications 1989: 30: 298–301]. The larger molecule/smaller strain rate observed is attributable to the more unstable nature of high molar mass polymers when subjected to extensional stresses. Below the critical strain rate for a polymer molecule of a given molar mass and chemical composition, there is a low probability of molecular scission.

Assuming the constriction has little or no length in the direction of flow, and thus little attendant pressure loss, factors directly affecting the strain rate include the diameter of the constriction, the flow rate of the polymer solution, the viscometric properties of the fluid, and the concentration of the polymer in the fluid. Of these factors, the diameter and precise geometry of the constriction defining the degree of the spatial contraction, the absolute dimensions of the convergence region of the flow field, and the flow rate of the fluid are factors most affecting the nature of the flow field, which in turn define the critical strain rate for a given polymer in solution. Passing scissioned, degraded polymer molecules again through a constriction, may induce additional chain scission events. Without restriction to any one theory or mode of operation, scission/degradation will continue so long as the strain rate imposed by the constriction is greater than the critical strain rate defined by the molar mass and chemical nature of the polymer. Using the present invention, over one or more passes through a fluid flow constriction, the degradative effect will produce a predomination of molecules which have a critical strain rate equivalent to the strain rate imposed by the constriction in flow.

Accordingly, the present invention is, in part, a method of modifying the molar mass distribution of a polymer solution. The inventive method includes (1) providing a fluid flow apparatus with a constricted flow configuration for differential fluid velocity in the flow direction; and (2) providing a polymer compound or composition having an initial known molar mass distribution, and introducing the polymer in either an aqueous, organic or mixed fluid medium to the apparatus and through the constricted configuration at a pressure sufficient to provide the fluid a flow field exerting a force on the polymer. In certain embodiments, the polymer has an initial polydispersity index greater than about 1.25. The force exerted is sufficient to modify the molar mass distribution of the polymer in solution.

A polymer useful herewith is compositionally, functionally and/or mass limited only by its degradative behavior in a suitable fluid medium and subject to the physical forces described herein. Any suitable fluid or solvent can be employed, depending on the polymeric material, taking into consideration various other parameters of the type described herein affecting the resulting physical forces imposed on the material. See, for instance, the solvents/media provided in example 5b. Likewise, systems of the sort heretofor utilized with fractionization processes of the prior art can be used in conjunction with this invention, such systems including but not limited to those provided in U.S. Pat. No. 5,264,536 which is incorporated herein by reference in its entirety. Similarly, polymer concentration can vary widely, limited by viscosity and polymer entanglement considerations, with a preference at least in some embodiments to maintain the polymer in solution or at least partially solvated by the fluid medium. Regardless, as illustrated by several examples below, useful polymer concentrations can be in the range of about 0.1%–about 0.5% (w/v). Likewise, as may be contrasted with the prior art, the polymer-containing medium or the fluid component thereof, in certain embodiments, can have a viscosity parameter of less than about 500 centipoise. Certain other embodiments, by way of either solvent component or the polymer-containing medium, can have a viscosity of about 1 to about 10 centipoise. Without limitation, such a parameter can be utilized in contrast with prior art methodologies whereby higher viscosities are preferably employed to enhance turbulance and associated shear forces.

In part, the present invention is also a physical method of reducing the polydispersity index of a polymeric material. Such a method includes (1) providing a fluid flow apparatus with a constricted flow configuration for differential fluid velocity in the flow direction; and (2) providing a polymer compound or composition having an initial polydispersity index greater than about 1.25, and introducing the polymer in solution and/or a suitable fluid medium to the apparatus and through the constricted configuration at a pressure sufficient to provide the fluid a flow field exerting a force on the polymer. The polymeric material in the fluid medium has an initial polydispersity index, and the force exerted thereon, as described above, is sufficient to reduce the index, such reduction to an extent desired, depending in part upon polymer identity and factors relevant to the critical strain rate of any such polymer. In certain embodiments, as a clear distinction from the prior art, monodisperse polymer compounds and/or those compounds approaching monodispersity are prepared using the elongation flows and associated forces described herein.

With respect to this method and other methodologies described herein, the subject high polymer has applied thereto a strain rate dependent, in part, upon flow rate, flow field dimension and constriction diameter and geometry. In some embodiments, flow rates are between about 1 and about 2 ml/s, depending upon the polymer and its concentration. Micron-scale component geometries and constrictive apertures can be used to provide a desired elongation flow field and fluid velocity differential over the course thereof. Depending upon initial polymer mass distribution and/or polydispersity index, a single introduction/injection may suffice to shift the mass distribution and/or reduce the index. In various embodiments, multiple introductions or recirculation of the polymer-containing fluid or solution can be used to further narrow mass distribution and approach monodispersity.

In part, the present invention is also a method of using an elongation flow field to control polymer average molar mass. Such a method includes (1) providing a fluid flow apparatus with a constricted flow configuration for differential fluid velocity in the flow direction; and (2) providing a polymer compound or composition having an initial average molar mass, and introducing the polymer in solution and/or a suitable fluid medium to the apparatus and through the constricted configuration at a pressure sufficient to induce an elongation flow field exerting a force on the polymer. Related thereto, this invention can also include a method of using the strain rate or a constricted fluid flow to reduce the polydispersity index of a polymer. As explained more fully above, introduction of a polymer containing medium to the apparatus and through a constricted configuration is achieved at a pressure sufficient to provide a fluid flow having a strain rate sufficient to meet the critical strain rate of the subject polymer. Pressures useful herein vary depending upon polymer concentration, solution viscosity and a desired flow rate, which in turn depends upon a critical strain rate for a given polymeric material. However, pressures useful with the micron-scale apparatus described herein are preferably between about 500 psi and about 1,200 psi.

The methodologies associated with this invention can be effected with a variety of suitable components, devices or apparatus, limited only by functional attributes of the type described herein. The results obtained—modified molar mass distribution, reduction of polydispersity index and the like—can be enhanced by multiple, repeated or sequential introduction of a polymer solution to or recirculation through such a component, device or apparatus.

As mentioned above, process parameters are interrelated and dependent, in part, upon the subject polymer, solution viscosity and apparatus design or configuration. However, optimal process parameters and conditions for any polymer system will be readily determined using straightforward application or modification of the principles and guidelines herein, such applications and/or modifications by those individuals skilled in the art, aware of this invention and the various functional and physical relationships described in conjunction therewith.

In part, as can be prepared using the methodologies described herein, the present invention can also include a monodisperse polymer composition having a molar mass of at least about 500,000 g/mol and a polydispersity index of less than about 1.09. In certain embodiments, such compositions include polymers illustrated below and/or those having reactive side chains or functional substituents precluding living polymerization techniques of the prior art. Such compositions, irrespective of their chemical nature, include those polymers having polydispersity indices lower than otherwise attainable, irrespective of molar mass, but in certain embodiments between about $10^5$ to about $10^6$ g/mol.

EXAMPLES OF THE INVENTION

The following non-limiting examples, data and referenced figures illustrate various aspects and features relating to the novel methods and compositions of this invention, including the surprising and unexpected availability of polymeric compositions having polydispersity indices below those heretofore available through methods of the prior art. While the utility of this invention is illustrated through the use of several polymers and/or solutions which can be used in conjunction with the various methods described herein, it will be understood by those skilled in the art that comparable results are obtainable with other polymers/solutions, as are commensurate with the scope of this invention.

Example 1

Figure 2:
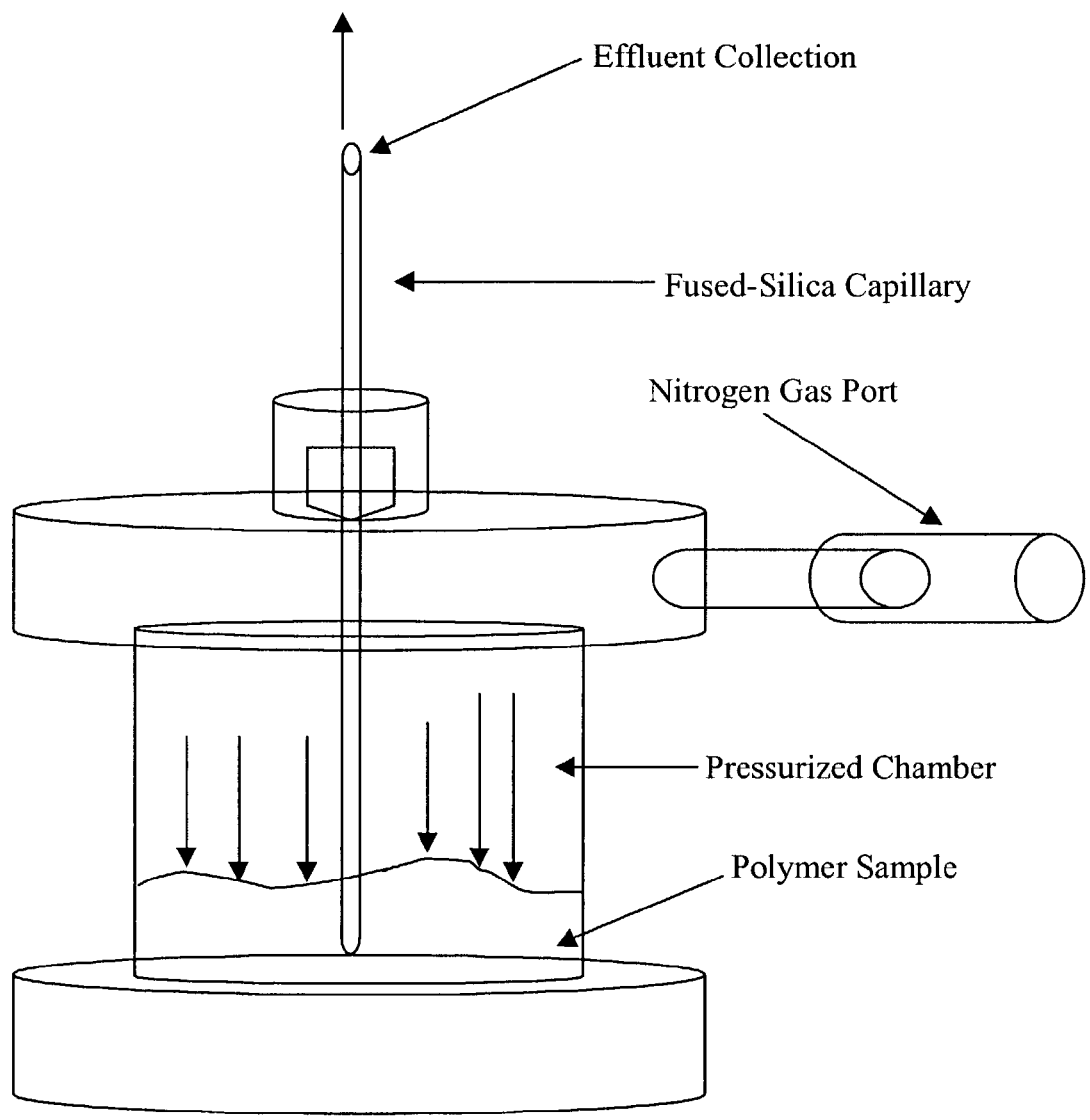
FIG. 2: Schematic illustration of pressure loading device with suspended capillary.
Figure 3:
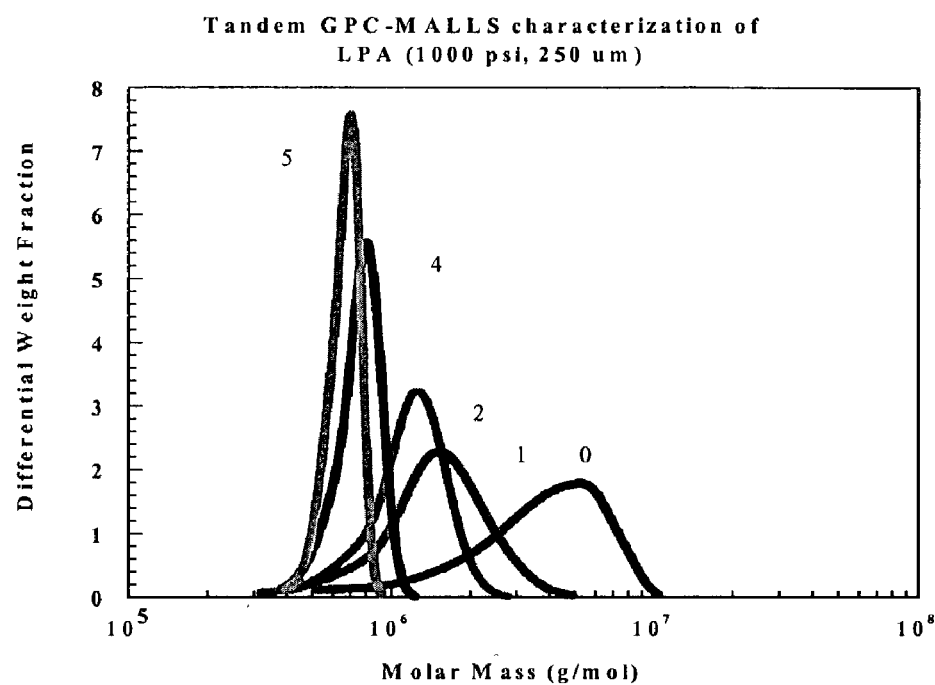
FIG. 3: Mechanical degradation of linear polyacrylamide (LPA) at an input pressure of 1,000 psi, with a capillary inner diameter of 250 micrometers and a concentration of 0.1% w/v. Original Sample (0), $M_w$ 4.1×$10^6$ g/mol, PDI: 1.42. 1 Pass (1) $M_w$ 1.6×$10^6$ g/mol, PDI: 1.23. 2 Passes (2) $M_w$ 1.2×$10^6$ g/mol, PDI: 1.12. 4 Passes (4) $M_w$ 7.6×$10^5$ g/mol, PDI: 1.04. 5 Passes (5) $M_w$ 6.6×$10^5$ g/mol, PDI: 1.02.
Figure 4:
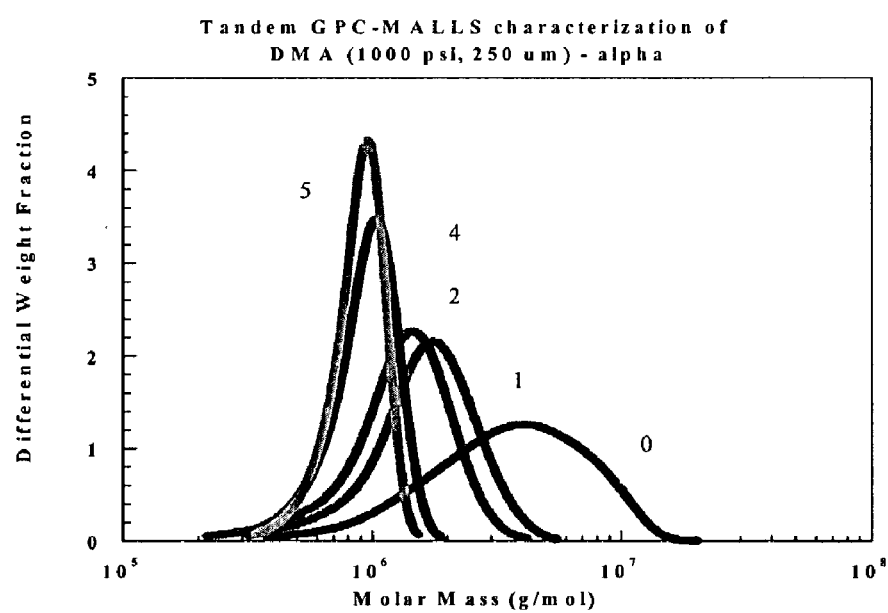
FIG. 4: Mechanical degradation of polydimethylacrylamide (DMA) at an input pressure of 1,000 psi with a capillary inner diameter of 250 micrometers and a concentration of 0.1% w/v. Original Sample (0), $M_w$ 4.3×$10^6$ g/mol, PDI: 1.62. 1 Pass (1) $M_w$ 1.8×$10^6$ g/mol, PDI: 1.26. 2 Passes (2) $M_w$ 1.4×$10^6$ g/mol, PDI: 1.27. 4 Passes (4) $M_w$ 9.7×$10^5$ g/mol, PDI: 1.10. 5 Passes (5) $M_w$ 9.0×$10^5$ g/mol, PDI: 1.06.
Figure 5:
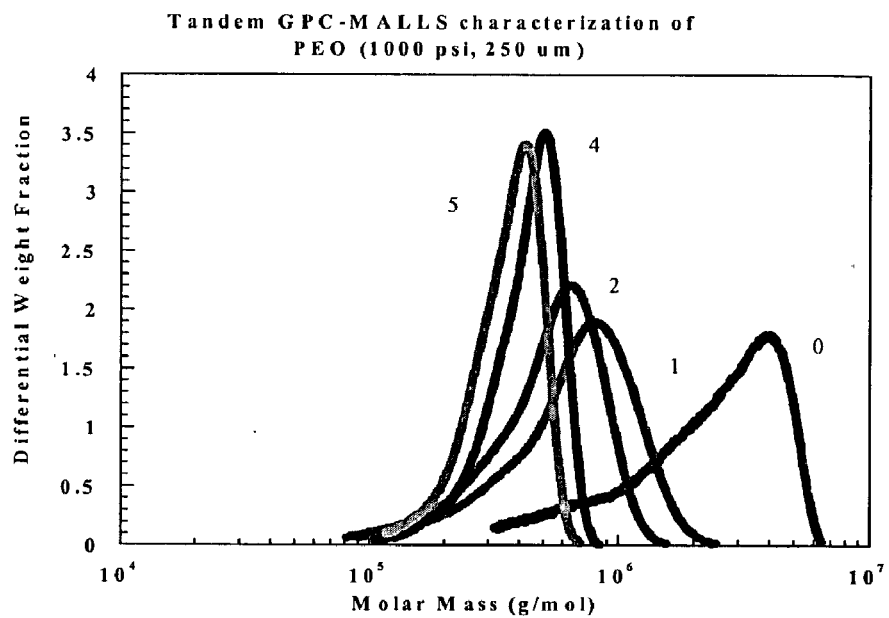
FIG. 5: Mechanical degradation of poly(ethylene oxide) (PEO) at an input pressure of 1,000 psi, with a capillary inner diameter of 250 micrometers and a concentration of 0.1% w/v. Original Sample (0), $M_w$ 2.7×$10^6$ g/mol, PDI: 1.59. 1 Pass (1) $M_w$ 7.5×$10^5$ g/mol, PDI: 1.42. 2 Passes (2) $M_w$ 5.7×$10^5$ g/mol, PDI: 1.32. 4 Passes (4) $M_w$ 4.4×$10^5$ g/mol, PDI: 1.12. 5 Passes (5) $M_w$ 3.7×$10^5$ g/mol, PDI: 1.11.
Figure 6:
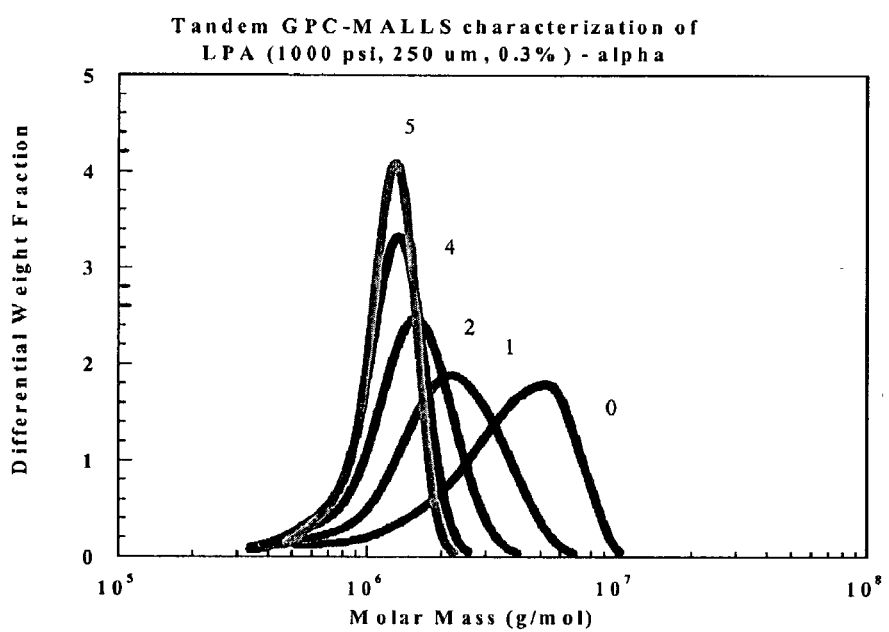
FIG. 6: Mechanical degradation of linear polyacrylamide (LPA) at an input pressure of 1,000 psi, with a capillary inner diameter of 250 micrometers, and a concentration of 0.3% w/v. Original Sample (0), $M_w$ 4.1×$10^6$ g/mol, PDI: 1.42. 1

High molar mass, polydisperse polymers prepared by free-radical polymerization were injected into fused-silica capillaries at a fixed injection pressure ($6.9 \times 10^4$ Pa). The capillaries were cut to length (15 cm) by means of a diamond capillary cutter to ensure a reasonably flat orifice, and inspected the capillary orifice via optical microscopy. Injection was accomplished by means of a custom-built pressure-loading device, into which a charge of approximately 9 mL of polymer could be held. A fused-silica capillary was extended into the polymer reservoir and sealed with a Swagelok valve. (Reference is made to FIG. 2 for a schematic illustration of one apparatus/component configuration which can be used to effect the methods of this invention.) A side-mounted gas port allowed the application of nitrogen gas to quickly propel the polymer solution through the capillary. The apparatus and procedure of this example were used to examine the effects of this treatment on both water-soluble and organo-soluble polymers, including linear polyacrylamide and polydimethylacrylamide (in water), and poly(ethylene oxide) and polystyrene (in toluene) at dilute to semi-dilute concentrations (0.1–0.3% w/v). Injected polymer was collected and re-injected 4–5 times to simulate multiple passes through the contraction defined by the capillary entrance. After each pass, a sample of the injected effluent was collected and analyzed by gel permeation chromatography in tandem with multiple angle laser light scattering (GPC-MALLS), a well-known absolute polymer characterization method, in order to determine molar mass distribution and polydispersity index. Likewise, it would be understood to utilize one or more suitable chromatographic columns, commercially available, depending upon polymer size and pore dimension, to achieve efficient fractionation. The flow rates through fractionation columns were kept extremely low (0.3 mL/min.) in order to minimize any possibility of degradation during passage through the GPC columns. Polymer samples were injected at dilute to semi-dilute concentrations to simplify the rheological properties of the flow, allowing us to assume the density and viscosity of the polymer solutions were essentially that of water.

Example 2

With reference to the procedures of Example 1 and the data of FIGS. 3–8, it is observed that the polydispersity index of each degraded polymer sample decreases sharply, even after only one injection. As polymer molecules traverse and/or undergo scission in the elongational field, the molar mass distribution is shifted to the left and narrowed significantly. It is clear that more massive polymer molecules, whose molar mass corresponds to a critical strain rate much lower than the strain rate applied by the flow field, have a higher probability of undergoing scission than less massive molecules. Each successive scission event further decreases both the average molar mass and polydispersity index, the latter to values of less than 1.20. Beyond a critical number of passes through the contraction, the average molecular weight of the distribution effectively ceases to decrease, although the polydispersity index may continue to decrease. Without limitation, this "cut-off" molecular weight may be explained by noting that when the critical strain rate for scission for a polymer molecule in solution is equivalent to, or greater than, the strain rate exerted by the flow field, little or no chain scission should occur. Thus, after a certain number of passes, the largest chains in the molar mass distribution will be of the size corresponding to a critical strain rate equivalent to the strain rate of the flow field. Smaller chains created through multiple scission events may also exist, explaining the existence of short-chain polymers and the extent of polydispersity that remains after multiple injections. Continued injection has the effect of honing the distribution to greater monodispersity. Polydispersity indices as low as about 1.01–about 1.13 are reached routinely via this mechanical degradation process; these DPI values are reasonably equivalent to those currently achievable through anionic living polymerization for polymers of this size (~$1 \times 10^6$ g/mol).

Example 3

Results for the variation of contraction diameter and injection pressure were of mixed significance; varying the pressure from $3.45 \times 10^4$ Pa to $8.27 \times 10^4$ Pa did not appear to have a significant effect upon the final average molar mass, nor did it appear to have a significant effect upon the value of the final PDI that could be achieved. Flow rates did not vary significantly from the norm of 1.15 ml/s for each injection, suggesting that the velocity differential across the contraction was not significantly changed, and thus the strain rate was relatively constant despite the alteration in injection pressures. For variations in capillary id to either 150 micron or 324 micron, again, flow rates did not deviate significantly from the 1.15 ml/s benchmark; however, for experiments run using a capillary id of 75 micron, flow rates were decreased, and the extent of degradation was mitigated as well. This discrepancy suggests that an order of magnitude change in constriction diameter and injection pressure is necessary to alter the degradational properties of the flow field in a detectable fashion. However, the strain rate is known to be reliant upon the flow rate, velocity differential and pressure drop across the constriction; in this manner, the strain rate and the final product of mechanical degradation may both be controlled.

Example 4

Although shear forces and turbulent extensional forces in tube flow also have been known to have degradational effects on polymers, varying the length of the capillary tube seemed to provide no significant change in either final molar mass or final polydispersity. In all cases, the Reynolds number of flow within the capillary tube exceeds the turbulent boundary (Re>2200). This suggests that turbulent forces within the capillary are reasonably negligible in comparison to the elongational deformation of the polymer molecules caused by the contraction at the capillary entrance. These results are in agreement with previous investigation of elongational flow in the capillary geometry.

Example 5

The method(s) of elongational degradation, mass distribution shift and polydispersity reduction described herein appears to be general, giving similar results for all polymers examined, thereby demonstrating broad utility and providing a route to a group of previously unavailable monodisperse high polymers. Using a suitable solvent or fluid medium, each polymer species was seen to undergo a molar mass distribution shift and polydispersity decrease similar to that observed for linear polyacrylamide in water. The final average molar mass reached after multiple passes was independent of the original molar mass distribution and the original polydispersity. Degradation was observed in all species examined to occur on the first pass, significantly for some species decreasing as the average molar mass shifts towards that critical strain rate corresponding to the strain rate exerted by the flow field.

Example 5a

As discussed above, the methodologies of this invention can be employed without regard to polymer identity, using an apparatus of the sort or comparable to that described in example 1. Accordingly, without limitation, this invention is utilized in conjunction with the following classes of polymers, each illustrated as shown.

Polyamides; e.g., nylon 6, nylon 66
Polyenes; e.g., polyethylene, polypropylene, polystyrene
Polyvinyls; e.g., polyvinyl chloride, polyacrylonitrile, poly (methyl) methacrylate
Poly(aklylene) oxides; e.g., polyethylene oxide, polypropylene oxide
Polyesters; e.g., poly(ethylene terephthalate) and poly(butylene terephthalate)
Polycarbonates; e.g., poly(ethylene carbonate), poly(propylene carbonate), poly(cyclohexene carbonate), bisphenol A polycarbonate Biopolymers; e.g., polysaccharides, polypeptides, cellulose, chitin, chitosan Such polymers are utilized regardless of initial molar mass or polydispersity index, or are provided, in accordance herewith, having a polydispersity index from about 1.01 to less than about 1.15. Depending on initial molar mass, all such polymers are hereby prepared at molecular weights greater than about $10^5$ g/mol with an index less than about 1.09.

Example 5b

The fluid media employed with the present methods and/or compositions can vary as may be required for a particular polymer or constricted flow apparatus to effect physical modification and/or degradation of the type described herein. Numerous solvents, co- or mixed solvent systems are available. For example, as may be utilized with one or more of the polymers of the preceding example, the fluid media of this invention include various aqueous, protic, polar, polar non-protic and non-polar solvents such as but not limited to linear and cyclic hydrocarbons, alcohols, carboxylic acids, amides, amines, esters, ketones, aldehydes, linear and cyclic ethers and/or halogenated hydrocarbons. Further, alone or in combination with any of the preceding solvents, various polymers referenced herein can be modified with one or more supercritical fluids known in the art, such as but not limited to carbon dioxide, low weight hydrocarbons, nitrous oxide, sulfur hexafluoride, various halogenated hydrocarbons and the noble gases (e.g., xenon, etc.). The use and recyclability of such supercritical fluids enhance the economic and environmental benefits associated with this invention.

The methods of this invention can be utilized as a refining, preparative step for synthetic polymers of industrial significance. Polymers which are desired in monodisperse preparation may first be produced chemically through efficient, low-cost conventional synthetic methods such as free radical polymerization, rather than through expensive, complicated, and environmentally unfriendly methods such as anionic and living polymerization, then refined to the required molar mass and monodispersity via devices designed to cause controlled mechanical degradation of the polymers in solution. Biomedical, pharmaceutical, and biotechnological applications, for instance, often require polymeric materials of a precisely characterized nature and a large molar mass. From a compositional perspective, the wide range of monodisperse polymers available through this invention can meet such requirements and provide the impetus for the development of other new, innovative applications.

While the principles of this invention have been described in connection with specific embodiments, it should be understood clearly that these descriptions are provided only by way of example and are not intended to limit, in any way, the scope of this invention. For instance, while a particular injection/constricted flow apparatus is described, various other components can be arranged or configured and used comparably, with the aforementioned attention afforded to entrance flow design. In as much as the present methodologies are of a mechanical and/or physical nature, not influenced by polymer chemistry or reactivity, comparable results are attainable over a wide range of polymer and solvent/fluid systems. Other advantages and features will become apparent from the claims provided hereinafter.

What is claimed is:

1. A physical method of reducing the polydispersity index of a polymer composition, said method comprising:
   providing a polymer composition in a fluid medium, said polymer composition having an initial known polydispersity index; and
   exerting an extensional flow field force on said polymer composition, said force sufficient to reduce said polydispersity index.

2. The method of claim 1 wherein said polymer composition has a weight-average molar mass greater than about $10^5$ g/mol and an initial polydispersity index greater than about 1.25.

3. The method of claim 2 wherein said polymer composition is a polyacrylamide.

4. The method of claim 3 wherein said polyacrylamide has a concentration in said fluid medium of about 0.1% to about 0.5% w/v.

5. The method of claim 1 wherein said polymer composition is solvated by said fluid medium, said medium selected from linear and cyclic hydrocarbons, alcohols, carboxylic acids, amides, amines, esters, ketones, aldehydes, linear and cyclic ethers, carbon dioxide, low weight hydrocarbons, nitrous oxide, sulfur hexa fluoride, halogenated hydrocarbons, the noble gases and combinations thereof.

6. The method of claim 1 wherein said initial polydispersity index is reduced to less than about 1.15.

7. The method of claim 1 wherein said force meets the critical strain rate of a subset of chains within said polymer composition, said force sufficient to induce chain scission.

8. The method of claim 1 comprising a plurality of said introductions.

9. A method of using constricted flow to reduce the polydispersity index of a high polymer composition, said method comprising:
   providing a polymer composition in a fluid medium, said polymer composition having an initial polydispersity index greater than about 1.25;
   flowing said fluid medium at least once through a spatial construction; and
   exerting an extensional flow field force on said polymer composition, said force sufficient to induce chain scission and reduce said polydispersity index.

10. The method of claim 9 wherein said polymer composition has a weight-average molar mass greater than about $10^5$ g/mol.

11. The method of claim 10 wherein said fluid medium comprises at least one of water and an organic solvent.

12. The method of claim 11 wherein said polymer composition is solvated by said fluid medium.

13. The method of claim 9 wherein said initial polydispersity index is reduced to less than about 1.15.

14. The method of claim 13 wherein said reduced polydispersity index is less than about 1.09.

15. A method of modifying the molar muss distribution of a polymer composition, said method comprising:
   providing a polymer composition in a fluid medium, said polymer composition having an initial molar mass distribution and a polydispersity index greater than about 1.25; and
   exerting an extensional flow field force on said polymer composition, said force sufficient to modify said mass distribution.

16. The method of claim 15 wherein said initial mass distribution is between about $10^5$ and about $10^7$ g/mol.

17. The method of claim 16 wherein said initial mass distribution is narrowed and shifted to lower average molecular weights.

18. The method of claim 17 comprising a plurality of said introductions.

19. The method of claim 15 wherein said fluid medium comprises at least one of water and an organic solvent.

20. The method of claim 19 wherein said polymer composition is dissolved in said fluid medium.

21. A monodisperse polymeric composition having a molar mass greater than about 500,000 g/mol, said composition having a polydispersity index less than about 1.09.

22. The composition of claim 21 wherein said composition is a condensation polymerization product.

23. The composition of claim 22 comprising a polyacrylamide.

24. The composition of claim 21 wherein said composition is a free radical polymerization product.

25. The composition of claim 24 comprising a polystyrene.

26. The composition of claim 21 wherein said composition is an addition polymerization product.

27. The composition of claim 26 comprising a poly (alkylene)oxide.

28. The composition of claim 21 wherein said polydispersity index is less than 1.09.

* * * * *

UNITED STATES PATENT AND TRADEMARK OFFICE
CERTIFICATE OF CORRECTION

PATENT NO. : 7,026,414 B1  Page 1 of 1
APPLICATION NO. : 10/313936
DATED : April 11, 2006
INVENTOR(S) : Annelise E. Barron et al.

It is certified that error appears in the above-identified patent and that said Letters Patent is hereby corrected as shown below:

Col. 11, Line 51: "hexa fluoride" should be --"hexafluoride--

Col. 12, Line 5: "construction" should be --constriction--

Col. 12, Line 21: "muss" should be --mass--

Signed and Sealed this

Twenty-eighth Day of November, 2006

JON W. DUDAS
*Director of the United States Patent and Trademark Office*